US010306326B1

(12) United States Patent
Nijim

(10) Patent No.: US 10,306,326 B1
(45) Date of Patent: May 28, 2019

(54) CHANNEL JUMPING

(75) Inventor: Yousef Wasef Nijim, Roswell, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 13/567,443

(22) Filed: Aug. 6, 2012

(51) Int. Cl.
H04N 21/462 (2011.01)
H04N 21/482 (2011.01)

(52) U.S. Cl.
CPC ....... *H04N 21/4826* (2013.01); *H04N 21/462* (2013.01); *H04N 21/482* (2013.01)

(58) Field of Classification Search
None
See application file for complete search history.

(56) References Cited

U.S. PATENT DOCUMENTS

| 5,532,754 | A  | * | 7/1996 | Young | G04G 15/006 |
| | | | | | 348/563 |
| 6,600,522 | B1 | * | 7/2003 | Kim | H04N 5/44543 |
| | | | | | 348/563 |
| 6,766,526 | B1 | * | 7/2004 | Ellis | H04N 5/44543 |
| | | | | | 348/569 |
| 7,224,409 | B2 | * | 5/2007 | Chin | H04N 5/50 |
| | | | | | 348/564 |
| 7,565,673 | B1 | * | 7/2009 | Brusky | H04N 5/4403 |
| | | | | | 725/39 |
| 7,596,797 | B1 | * | 9/2009 | Kapner, III | H04N 5/44543 |
| | | | | | 725/44 |
| 2002/0184650 | A1 | * | 12/2002 | Stone | 725/131 |
| 2003/0163456 | A1 | * | 8/2003 | Hua | H04N 7/17318 |
| 2004/0140995 | A1 | * | 7/2004 | Goldthwaite | H04N 5/44543 |
| | | | | | 715/716 |
| 2005/0027705 | A1 | * | 2/2005 | Sadri | G06F 17/30241 |
| 2006/0130098 | A1 | * | 6/2006 | Rao et al. | 725/53 |
| 2008/0244643 | A1 | * | 10/2008 | Virzi et al. | 725/37 |
| 2009/0094235 | A1 | * | 4/2009 | White | G06F 17/3053 |
| 2009/0100147 | A1 | * | 4/2009 | Igarashi | H04N 7/17309 |
| | | | | | 709/218 |
| 2010/0020249 | A1 | * | 1/2010 | Randall | H04N 5/50 |
| | | | | | 348/731 |
| 2010/0325665 | A1 | * | 12/2010 | Mountain | 725/44 |

* cited by examiner

*Primary Examiner* — Fernando Alcon
(74) *Attorney, Agent, or Firm* — Merchant & Gould P.C.

(57) ABSTRACT

Channel jumping is provided for allowing a user to quickly find and jump to desired content on a desired channel. Channel data and metadata and program guide data may be received by a data mining engine. The data mining engine may associate the channel data and metadata with the program guide data and cache the resulting associated channel/guide data. A user may enter a channel name, call letters, or a name of a program in a user interface, wherein a channel jumping application may search the channel/guide data for a match. If a match is found, the application may jump provide for jumping to the desired channel or if more than one match is found, the application may populate a list of possible matching channels to provide to the user.

18 Claims, 8 Drawing Sheets

CHANNEL JUMPING

BACKGROUND

Many content providers provide the user an ability to jump from channel to channel using known channel numbers usually unique to certain content providers. Users may select certain channels by entering the channel number and using the provided jumping ability to jump to the desired channel. For example, if a user desires to watch content provided by a television network and transmitted on channel number 241 and if he remembers the given channel number, then the user may enter the channel number "241" via an input device, such as a remote control to tune the device he is watching (e.g., television) to the given channel. Accordingly, the television may be tuned to the channel and the desired content may be displayed.

As can be appreciated, with content providers making hundreds of channels available, many users may find it difficult to remember specific channel numbers for desired channels and content. A user may also be travelling and may not be familiar with channel numbers provided by a given content provider. Additionally, users may be unaware that content they may be interested in could be airing on a different channel than the channel on which the content normally airs. Content providers have provided methods for finding desired content such as scrolling through channels in a guide overlay; however, such methods may be time consuming or frustrating to the user and may cause the user to miss part or all of his desired content.

It is with respect to these and other considerations that the present invention has been made.

SUMMARY

Embodiments of the present invention may provide for channel jumping that allows a user to quickly find and jump to desired content on a desired channel. According to one embodiment, a user may enter a channel name, call letters, or a name of a program that airs on a certain channel for jumping directly to the desired channel or for populating a list of possible matching channels for providing to the user. For example, a user may request a certain channel title and begin entering the name of that channel. If the channel is available to the user, that is, the user has the proper entitlements and subscriptions to the channel, the desired channel may appear on a guide overlay along with possible channel matches.

According to another embodiment, channel jumping by program titles may be provided. Information associated with content provided on a channel may be entered by the user and used by an application for jumping to the channel. For example, if the user desires to watch a specific program, but is not aware of the channel on which the program is airing, the user may enter the title of the program and a populated list of possible matches may be provided by a channel jumping application. Embodiments may be utilized in various delivery platforms such as a cable television services platform, Internet streaming through a broadband network, a digital subscriber line (DSL) network, Wi-Fi, satellite, etc.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
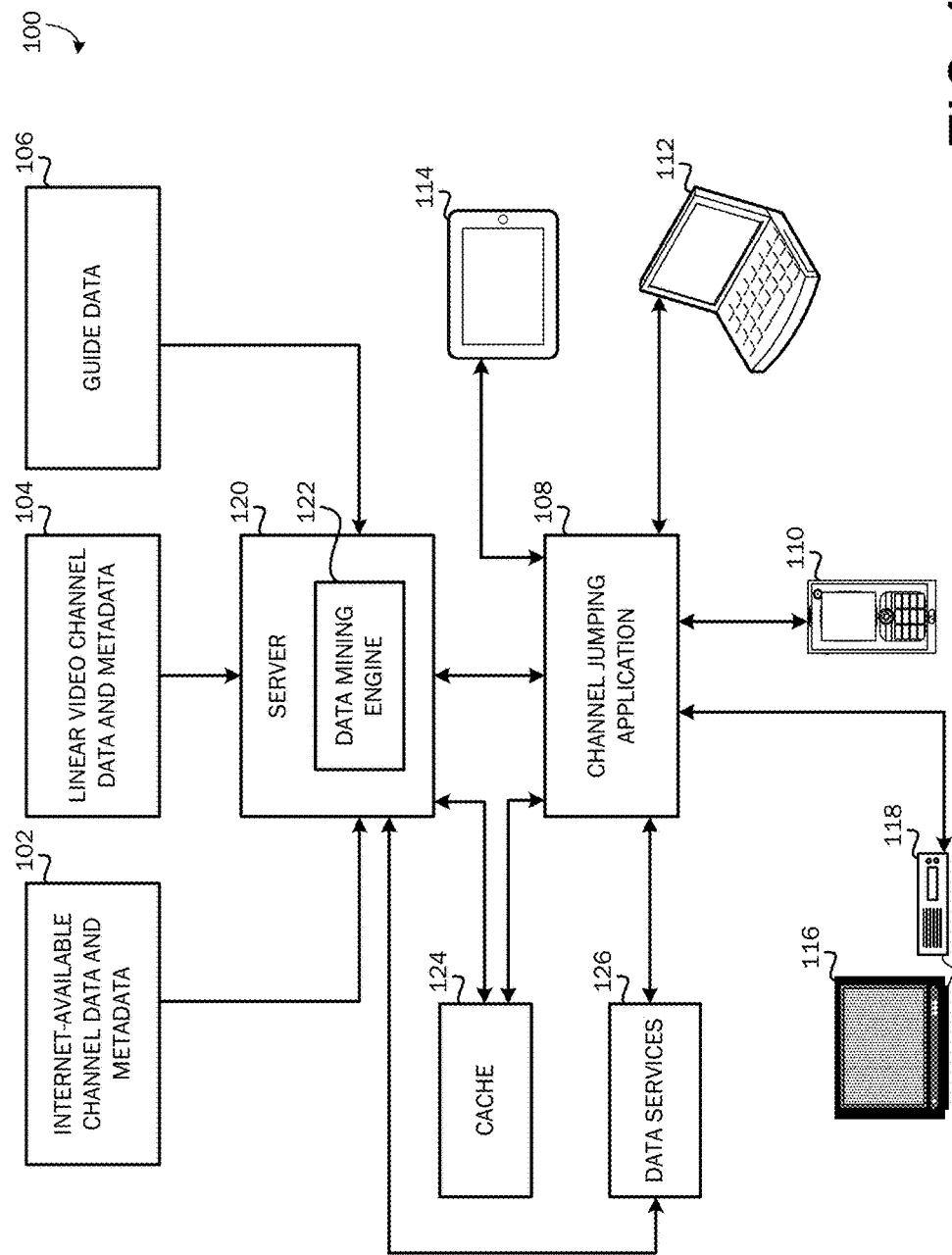
FIG. 1 is a simplified block diagram of a system for providing channel jumping.

As briefly described above, embodiments of the present invention are directed to channel jumping by receiving a full or partial channel name, logo, or call letter of the channel or a program title airing on the given channel. Embodiments may present a channel jumping user interface displayed over a full-screen television view as an overlay, as an overlay in a channel guide, or in another display form on a user's viewing device. Embodiments may be utilized on various types of viewing devices including, without limitation, televisions, wired and wireless viewing devices, mobile viewing devices (e.g., mobile telephones, netbooks, tablet or slate type computers, notebook computers, and laptop computers), or other hand held devices.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of a system 100 for providing channel jumping. As illustrated, Internet-available channel data and metadata 102, linear video channel data and metadata 104, and guide data 106 may be provided. For example, Internet-available channel data and metadata 102 may include video content data and metadata available on the Internet, such as YouTube®, Hulu®, etc. Linear video channel data and metadata 104 may include video content data and metadata available via a service provider, such as cable television (CATV) services system, satellite television provider, etc. The data and metadata may include information such as video content title, storyline, cast, genre, rating, release date, images, etc. Guide data 106 may include channel information, programming information, network information, etc.

The Internet-available channel data and metadata 102, linear video channel data and metadata 104, and guide data 106 may be provided to a server 120 where a data mining engine 122 may be operable to analyze and sort the data and metadata, and associate the channel data and metadata 102,104 with the guide data 106. The associated channel/guide data may be cached. The cache 124 is illustrated in FIG. 1 as a remote element, but may be integrated with the server 120 or the channel jumping application 108. As new information becomes available, the associated channel/guide data may be updated in the cache 124.

According to one embodiment, the cached associated channel/guide data may be specific to a user profile. The system 100 may include a data services system 126 which may comprise such information as billing data, permissions and authorization data, user profile data, etc. The data services system 126 may be accessed by the data mining engine 122 for checking permission, subscription, and profile data for associating channel and guide data to a specific user.

As illustrated in FIG. 1, various endpoint devices 110, 112, 114, 116, 118 may be utilized to access video content. For example, endpoint devices may include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a set top box (STB) 118. An endpoint device 110,112,114,116 may be utilized to access a channel jumping application 108.

The channel jumping application 108 may be operable to receive a request from a user for accessing associated channel/guide data and to provide channel jumping. A channel jumping user interface may be provided for entering at least a portion of a channel identification as a request. Channel identification may include, but is not limited to, a channel name, a channel logo, call letters, or a program title. The request may include a complete or a portion of a channel identification. For example, a user may enter channel name or a portion of a channel name (e.g., "NB" to access NBC). The channel identification may be received by the channel jumping application 108, and may access the server 120 or the cache 124 to receive the associated channel/guide data. If a match is found, the channel jumping application 108 may provide for an automatic "jump" to the desired channel. If more than one match is found, a listing of matches may be provided from which the user may choose the desired channel. For example, by entering "NB" to access a channel, a listing of matches may include NBC, digital NBC, and NBA channels. According to one embodiment, the channel jumping application 108, server 120, and data mining engine 122 may be integrated in a single system.

According to an embodiment, the data services system 126 may be accessed by the channel jumping application 108 for associated channel/guide data to a specific user. That is, all available associated channel/guide data may be provided by the server, wherein the channel jumping application 108 may be operable to filter the data according to permission and subscription information provided by data services 126. For example, if a user does not subscribe to digital programming or to the NBA channel, the channel jumping application 108 may determine that NBC is the only valid result for the channel identification provided by the user.

Figure 2:
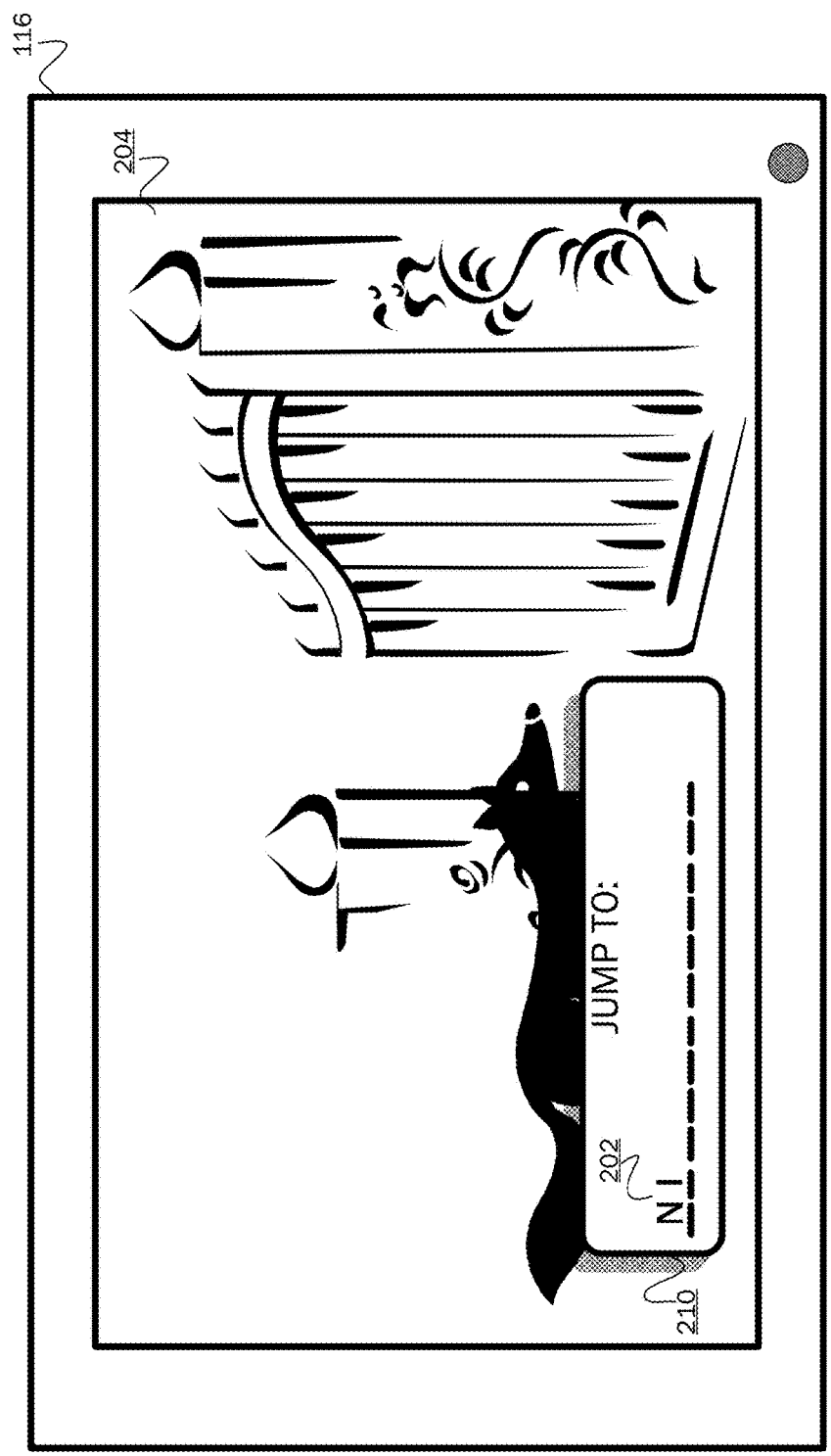
FIG. 2 is an illustration of a channel jumping user interface wherein the channel jumping application may receive a request for desired content.
Figure 3:
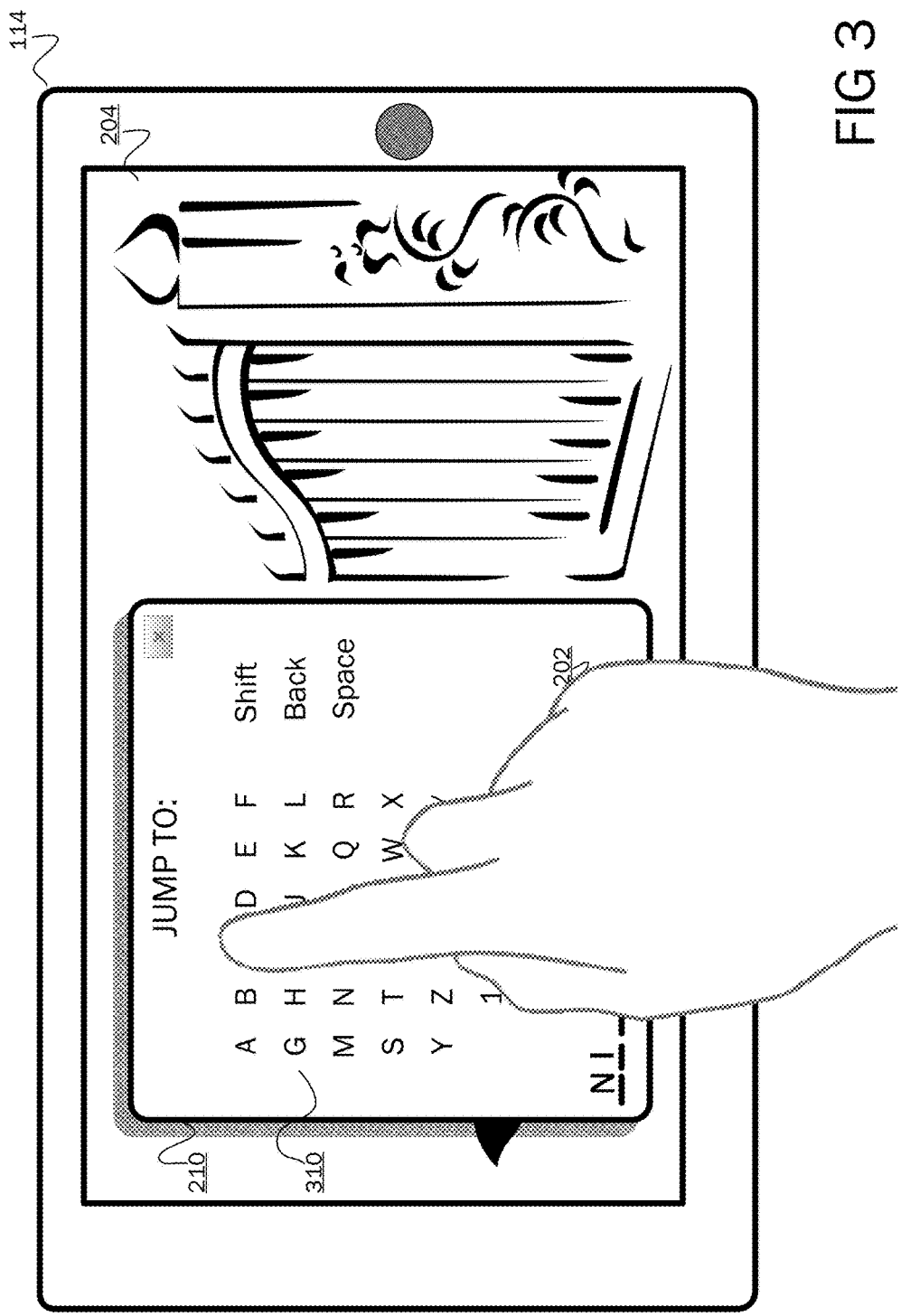
FIG. 3 is an illustration of a channel jumping user interface displayed on a tablet computing device wherein the channel jumping application may receive a request for desired content.

An example of a channel jumping user interface 210 is illustrated in FIG. 2. The channel jumping user interface 210 may appear as an overlay atop a channel 204 a user is currently viewing. The channel jumping user interface 210 may comprise an input area 202 for entering all or a portion of a channel name, a channel logo, call letters, or a program name. As illustrated in FIG. 3, a channel jumping user interface 210 may include a display of the alphabet 310 and numbers from which a user may use a remote control to select letters and/or numbers to enter channel or program information. According to an embodiment, a channel jumping user interface 210 may be included in a channel guide.

Figure 4:
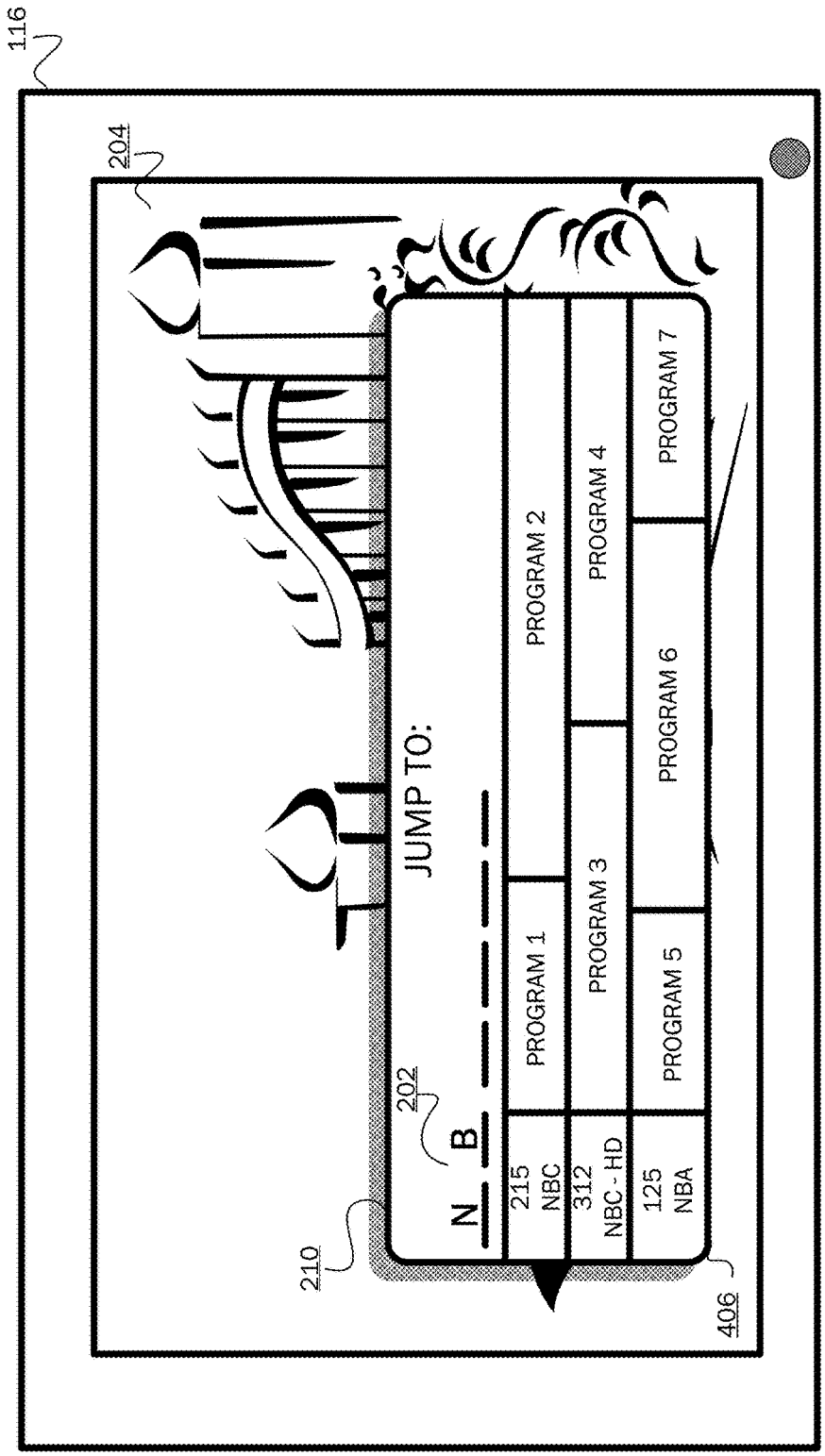
FIG. 4 is an illustration of a list of possible matches to a received request.

As illustrated in FIG. 4, upon receiving associated channel/guide data from the server 120 or the cache 124, the channel jumping user interface 210 may populate a list 406 with possible matches to a received channel identification. The populated list 406 of matching channels 204 may be sorted in order of best match to the requested information received from the user. According to an embodiment and as illustrated, the populated list 406 may display matches such that channels 204 to which the user has access or is subscribed to may be listed above channels 204 to which the user is not subscribed. The list 406 may also include only matches to channels 204 to which the user has access. As described above, subscription and permission information may be accessed via data services 126. The user may select the desired channel 204 from the populated list 406 of matches.

Figure 5:
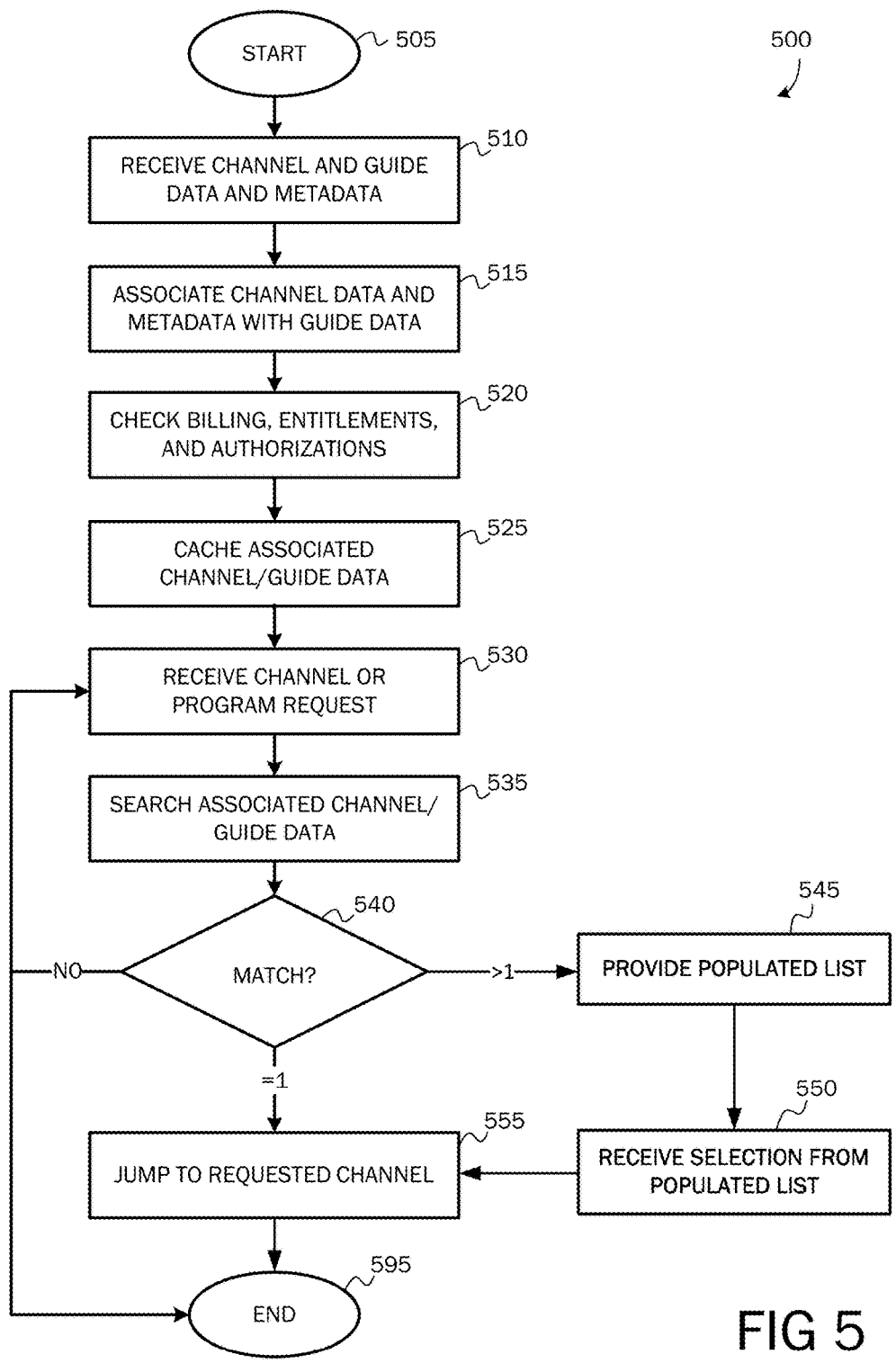
FIG. 5 is a flow chart of a method for providing jumping to a channel by entering channel information.

FIG. 5 is a flow chart of a method 500 for providing channel jumping according to embodiments. The method 500 begins at OPERATION 505 and proceeds to OPERATION 510 where Internet-available channel data and metadata 102, linear video channel data and metadata 104, and guide data 106 are received. As described above, the data and metadata 102,104,106 may include data and metadata about programming available via the Internet and linear programming and may include such information as information about available programs including program title, storyline, cast, genre, rating, release date, images, etc.

At OPERATION 515, the received channel data and metadata 102,104 may be analyzed and sorted and associated with the guide data 106 by the data mining engine 122. According to one embodiment, at OPERATION 520, the data mining engine 122 may query data services 126 to check entitlements, authorizations, and subscription information for a given user. According to another embodiment, the channel jumping application 108 may query data services 126 after receiving a request from a user. The resulting associated channel/guide data may be cached at OPERATION 525.

The method proceeds to OPERATION 530 where a channel or program request is received by the channel jumping application 108. The channel or program request may be entered into a channel jumping user interface 210 as described above and may include at least a portion of a channel identification. As described above, channel identification may include, but is not limited to, a channel name, a channel logo, call letters, or a program title. For example, if a user wants to watch a program titled "Soccer Show" broadcasted on a network titled "Sports Channel," he may enter "SOCC" as a partial entry of program data or may enter "SPO" as a partial entry of channel data. The user may also choose to enter a full title such as "SOCCER SHOW"

as the program title or "SPORTS CHANNEL" as the channel name to access the Soccer Show on the Sports Channel.

The method 500 proceeds to OPERATION 535 where associated channel/guide data is searched for a match to the request received at OPERATION 530. The associated channel/guide data may be stored in a cache 124 located on the server 120, on the application 108, or may be located remotely and accessed via a network.

At DECISION OPERATION 540, a determination is made whether there is a match between the received request and the associated channel/guide data. If there is not a match, the method 500 may return to OPERATION 530 where a user may be prompted to enter another request or may end at OPERATION 595. If at DECISION OPERATION 540 there are more than one matches found, the method 500 may proceed to OPERATION 545 where the matching results may be displayed to the user. As described above, according to one embodiment, the results may only include a listing of channels 204 and/or programs to which a user has access (e.g., according to subscription information, entitlements, authorizations, etc.). According to another embodiment, the results may include a listing of all matching channels 204 and/or programs and may be sorted such that channels 204 and/or programs to which a user has access are listed first. According to another embodiment, the results may be sorted in order of best match to the received request. According to yet another embodiment, the channel guide may be scrolled to a matching channel 204 or program. The method 500 may then proceed to OPERATION 550 where a channel 204 or program selection is made by the user and at OPERATION 555, the requesting endpoint device 110,112,114,116,118 may be tuned to the desired channel 204 and the programming may be displayed.

If at DECISION OPERATION 540 a single match is found, the method may proceed to OPERATION 555 where the requesting endpoint device 110,112,114,116,118 may be automatically tuned to the desired channel 204 and the programming may be displayed. Information may be stored with regards to the received request and determined matches and/or a channel or program selected by a user in order to store patterns and better predict user behavior. The method 500 ends at OPERATION 595.

Figure 6:
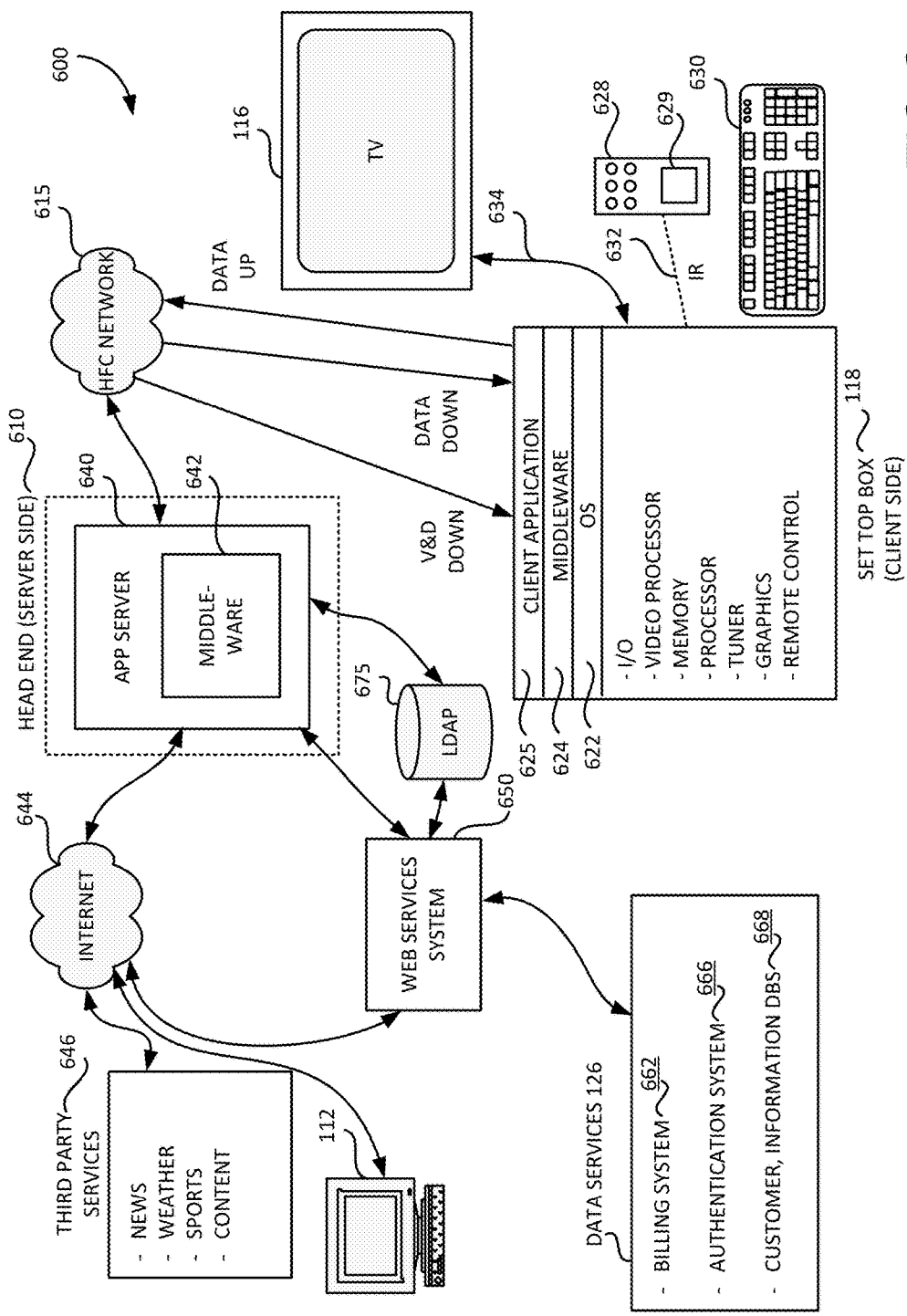
FIG. 6 is a simplified block diagram illustrating a cable television services system architecture providing an operating environment according to an embodiment.

FIG. 6 is a simplified block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing channel jumping. Referring now to FIG. 6, digital and analog video programming, information content and interactive television services are provided via a hybrid fiber coax (HFC) network 615 to a television set 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the client-side set-top box 118 and the server-side application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a client-side set-top box (STB) 118 functionally connected to a customer receiving device, such as the television set 116. As is understood by those skilled in the art, modern CATV systems 600 may provide a variety of services across the HFC network 615 including traditional digital and analog video programming, telephone services, high speed Internet access, video-on-demand, and information services.

On the client side of the CATV system 600, digital and analog video programming and digital and analog data are provided to the customer television set 116 via the set-top box (STB) 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below.

The STB 118 also includes an operating system 622 for directing the functions of the STB 118 in conjunction with a variety of client applications 625. For example, if a client application 625 requires a news flash from a third-party news source to be displayed on the television 116, the operating system 622 may cause the graphics functionality and video processor of the STB 118, for example, to output the news flash to the television 116 at the direction of the client application 625 responsible for displaying news items.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications 625 and operating systems 622 that allow the client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the set-top box 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client side of the CATV system 600 to the server side of the CATV system 600 via the HFC network 615 via one data uplink. The video/data downlink is an "in band" downlink that allows for digital and analog video and data signaling from the server side of the CATV system 600 through the HFC network 615 to the set-top box 118 for use by the STB 118 and for distribution to the television set 116. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 6, between the HFC network 615 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 640 is typically passed through the "out of band" data links. Alternatively, an "in band" data carousel may be positioned in an "in band" channel into which a data feed may be processed from the server-side application server 640 through the HFC network 615 to the client-side STB 118. Operation of data transport between components of the CATV system 600, described with reference to FIG. 6, is well known to those skilled in the art.

Referring still to FIG. 6, the head end 610 of the CATV system 600 is positioned on the server side of the CATV system and includes hardware and software systems responsible for originating and managing content for distributing through the HFC network 615 to client-side STBs 118 for presentation to customers via televisions 116. As described above, a number of services may be provided by the CATV system 600, including digital and analog video programming, interactive television services, telephone services, video-on-demand services, targeted advertising, and provision of information content.

The application server 640 is a general-purpose computing system operative to assemble and manage data sent to and received from the client-side set-top box 118 via the HFC network 615. As described above with reference to the set-top box 118, the application server 640 includes a middleware layer 642 for processing and preparing data from the head end of the CATV system 600 for receipt and use by the client-side set-top box 118. For example, the application server 640 via the middleware layer 642 may obtain data from third-party services 646 via the Internet 644 for transmitting to a customer through the HFC network 615 and the set-top box 118. For example, content metadata a third-party content provider service may be downloaded by the application server via the Internet 644. When the application server 640 receives the downloaded content metadata, the middleware layer 642 may be utilized to format the content metadata for receipt and use by the set-top box 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the set-top box 118 through the HFC network 615 where the XML-formatted data may be utilized by a client application 625 in concert with the middleware layer 624, as described above. As should be appreciated by those skilled in the art, a variety of third-party services data, including news data, weather data, sports data and other information content may be obtained by the application server 640 via distributed computing environments such as the Internet 644 for provision to customers via the HFC network 615 and the set-top box 118. According to embodiments, client application 640 may include the channel jumping application 108 described herein.

According to embodiments, the application server 640 obtains customer support services data, including billing data, information on customer work order status, answers to frequently asked questions, services provider contact information, and the like from data services 126 for provision to the customer via an interactive television session. As illustrated in FIG. 6, the services provider data services 126 include a number of services operated by the services provider of the CATV system 600 which may include data on a given customer.

A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include general customer information such as answers to frequently asked customer questions and contact information for various service provider offices/departments. As should be understood, this information may be stored in a variety of disparate databases operated by the cable services provider.

Referring still to FIG. 6, web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box identification associated with the customer. The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above.

An authentication system 666 may include information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
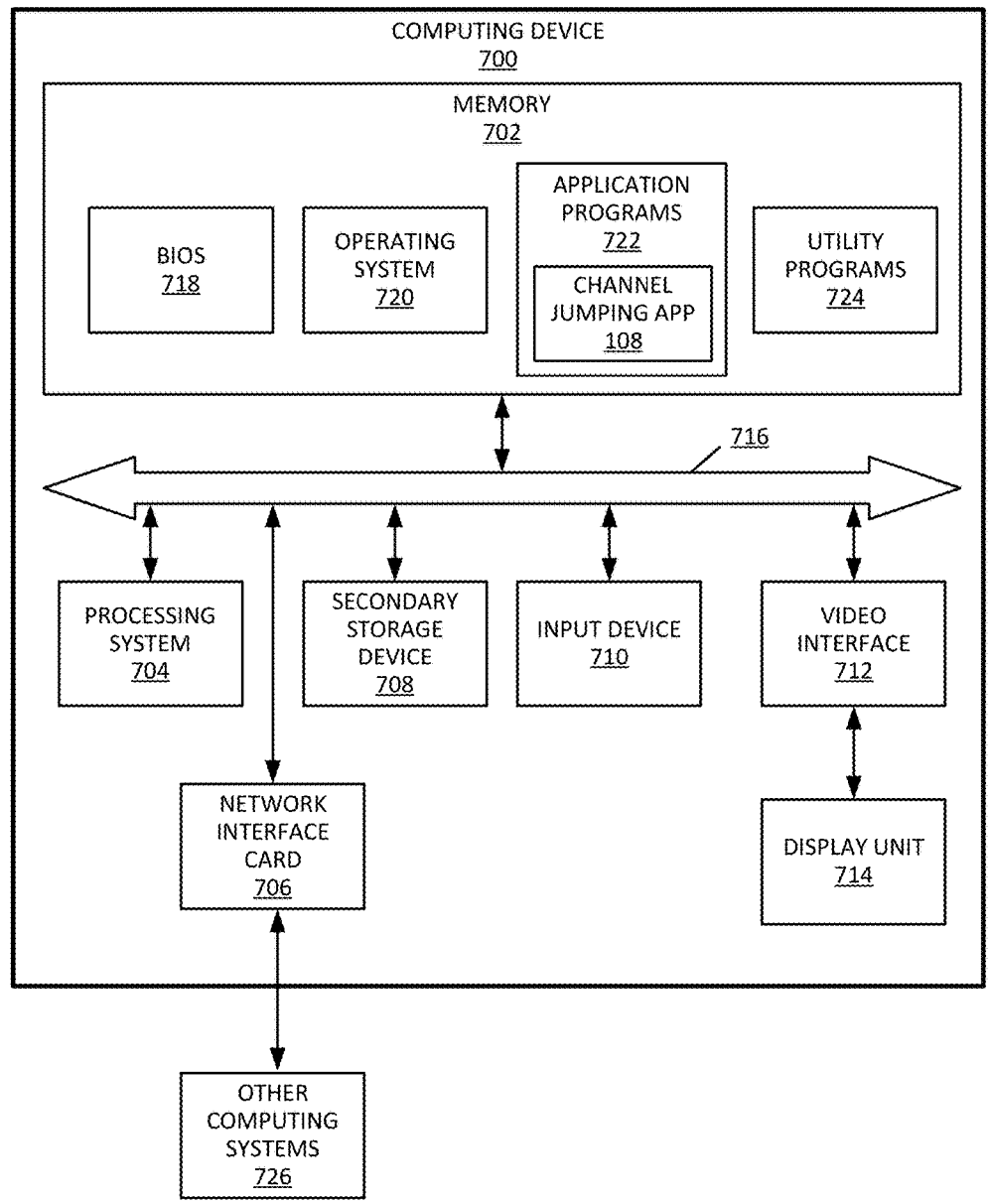
FIG. 7 is a simplified block diagram illustrating example physical components of a computing device with which embodiments may be practiced.

FIG. 7 is a simplified block diagram illustrating example physical components of a computing device 700 with which embodiments may be practiced. In some embodiments, one or a combination of the components 108,110,112,114,116, 118,120,122,124,126 of system 100 may be implemented using one or more computing devices like the computing device 700. It should be appreciated that in other embodiments, components 108,110,112,114,116,118,120,122,124, 126 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, the channel jumping application 108 may be stored locally on computing device 700. Memory 702 thus may store the computer-executable instructions that, when executed by processor 704, cause the channel jumping application 108 to allow users to jump to desired channels by entering a request based information such as channel name, logo, call letter, or programs as described above with reference to FIGS. 1-6.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more Intel Core microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the channel jumping application 108. The memory 702 also stores one or more utility programs 724 that, when executed by the processing system 704, cause the computing device 700 to provide utilities to other software programs.

Embodiments of the present invention may be utilized in various distributed computing environments where tasks are performed by remote processing devices that are linked through a communications network in a distributed computing environment.

Figures 8A, 8B:
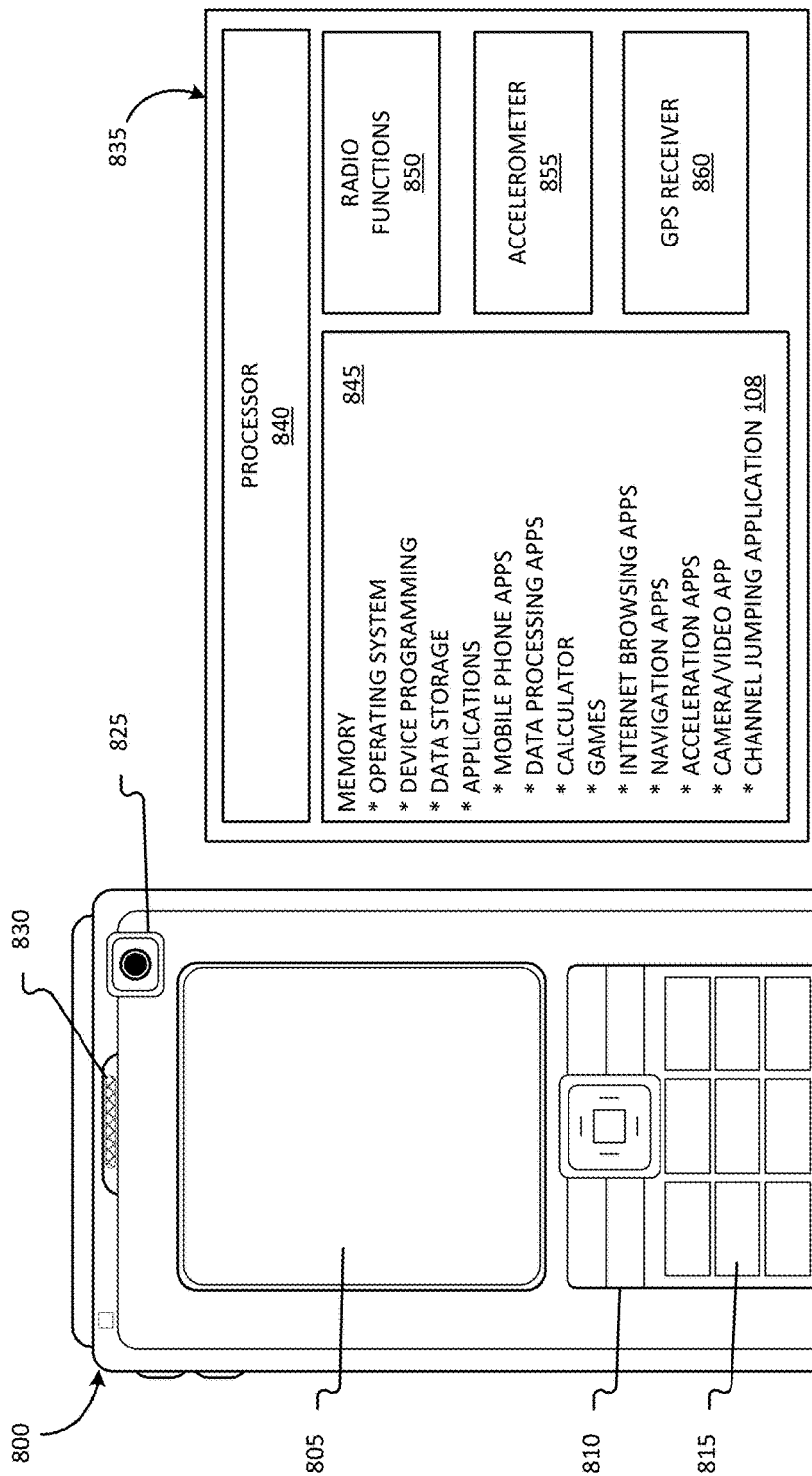
FIGS. 8A and 8B illustrate a suitable mobile computing environment with which embodiments may be practiced.

FIGS. 8a-b illustrate a suitable mobile computing environment, for example, a mobile computing device 110, a smart phone, a tablet personal computer 114, a laptop computer 112, and the like, with which embodiments may be practiced. The mobile computing device 800 is illustrative of any suitable device operative to send, receive and process wireless communications according to embodiments of the present invention. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the mobile computing device, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8b, operational unit 835 is illustrative of internal operating functionality of the mobile computing device 800. A processor 840 is illustrative of a general purpose computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the channel jumping application 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device's 800 location.

Although described herein in combination with mobile computing device 800, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

I claim:

1. A method for providing channel jumping, the method comprising:
   providing a channel jumping interface that overlays a portion of content currently being viewed, the channel jumping interface including an input area to receive alphanumeric input;
   receiving a request for a channel, the request comprising at least a portion of a channel identification;
   searching channel data for a channel matching the request;
   providing a list of matching channels wherein each matching channel comprises current and upcoming programs scheduled to be shown on each matching channel included on said list of matching channels, wherein the matching channels are sorted in the list of matching channels based on a prediction associated with stored patterns of previous selections of matching channels and in an order of first listing matching channels to which a requesting user has access according to subscription information, entitlements, and authorizations, above channels to which the requesting user is not subscribed;
   receiving a selection of a listed matching channel included on said list of matching channels; and
   in response to receiving the selection, jumping to the selected listed matching channel.

2. The method of claim 1, wherein receiving a request comprising at least a portion of a channel identification comprises receiving one of:
   at least a portion of a channel name;
   a channel logo; or
   at least a portion of a channel's call letters.

3. The method of claim 1, wherein searching the channel data for a channel matching the request comprises searching a cache of Internet-available and linear video channel data and metadata associated with guide data.

4. The method of claim 3, wherein searching the channel data for a channel matching the request further comprises accessing a data services system for checking subscription information, entitlements, and authorizations.

5. The method of claim 4, wherein providing a list of matching channels comprises providing only matching channels to which the requesting user has access according to subscription information, entitlements, and authorizations.

6. The method of claim 1, wherein providing a list of matching channels comprises providing a list of matching channels in an order of a closest match to the request.

7. A system for providing channel jumping, the system comprising:
   a memory storage; and
   a processing unit coupled to the memory storage, wherein the processing unit is operable to:
      provide a channel jumping interface that overlays a portion of content currently being viewed, the channel jumping interface including an input area to receive alphanumeric input;
      receive a request for a channel, the request comprising at least a portion of a channel identification;
      search channel data for a channel matching the request;
      providing a list of matching channels wherein each matching channel comprises current and upcoming programs, wherein the matching channels are sorted in the list of matching channels based on a prediction associated with stored patterns of previous selections of matching channels and in an order of first listing matching channels to which a requesting user has access according to subscription information, entitlements, and authorizations, above channels to which the requesting user is not subscribed;
      receive a selection of a listed matching channel included on said list of matching channels; and
      in response to receiving the selection, jump to the selected listed matching channel.

8. The system of claim 7, wherein the request comprising at least a portion of a channel identification comprises one of:
   at least a portion of a channel name; or
   a channel logo.

9. The system of claim 7, wherein the channel data comprises Internet-available and linear video channel data and metadata associated with guide data.

10. The system of claim 9, wherein the channel data is filtered according to subscription information, entitlements, and authorizations associated with a requesting user.

11. The system of claim 10, wherein the list of matching channels comprises only matching channels to which the requesting user has access according to subscription information, entitlements, and authorizations.

12. The system of claim 7, wherein the list of matching channels comprises a list of matching channels in an order of a closest match to the request.

13. The system of claim 7, wherein the processing unit is further operable to provide a channel jumping user interface and receive the request via the channel jumping user interface.

14. The system of claim 13, wherein the processing unit if further operable to receive the request via a channel jumping user interface displayed on one of:
   a mobile communication device,
   a computer; or
   a tablet computing device.

15. A computer readable storage device having computer-executable instructions for providing channel jumping, comprising:
   providing a channel jumping interface that overlays a portion of content currently being viewed, the channel jumping interface including an input area to receive alphanumeric input, wherein the channel jumping interface does not include a channel guide;
   receiving a request for a channel, the request comprising at least a portion of a channel identification;
   searching channel data for a channel matching the request;
   accessing a data services system for checking subscription information, entitlements, and authorizations associated with a requesting user;
   determining a number of channels matching the request;
   providing a list of matching channels wherein each matching channel comprises current and upcoming programs to which the requesting user has access according to subscription information, entitlements, and authorizations, wherein the matching channels are sorted in the list of matching channels based on a prediction associated with stored patterns of previous selections of matching channels from the guide, the list of matching channels includes matching channels to which the requesting user does not have access according to the subscription information, entitlements, and authorizations, and the list of matching channels to which the requesting user has access is presented above the list of matching channels to which the requesting user does not have access;

receiving a selection of a listed matching channel included on said list of matching channels; and in response to receiving the selection, jumping to the selected listed matching channel.

16. The computer readable storage device of claim 15, wherein receiving a request comprising at least a portion of a channel identification comprises receiving one of:

at least a portion of a channel name;

a channel logo; or at least a portion of a channel's call letters.

17. The computer readable storage device of claim 15, wherein searching channel data for a channel matching the request comprises searching a cache of Internet-available and linear video channel data and metadata associated with guide data.

18. The computer readable storage device of claim 17, wherein the cache of Internet-available and linear video channel data and metadata associated with guide data is specific to a user profile.

* * * * *